Oct. 16, 1923.
W. E. KELLY
1,471,268
DETACHABLE TIRE CARRIER
Filed Sept. 15, 1921
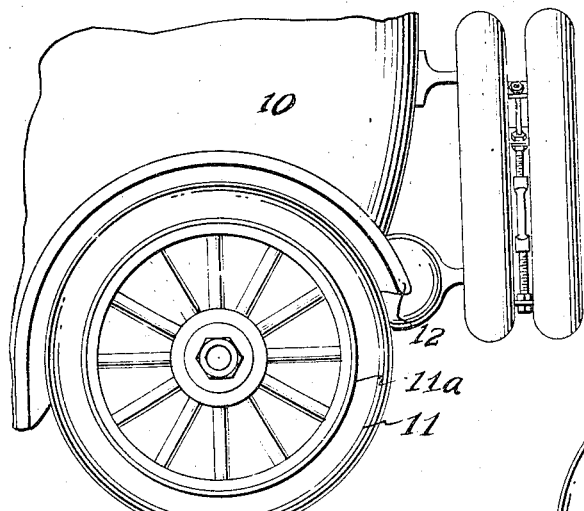
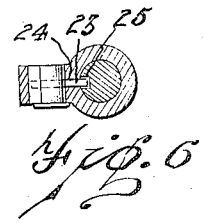
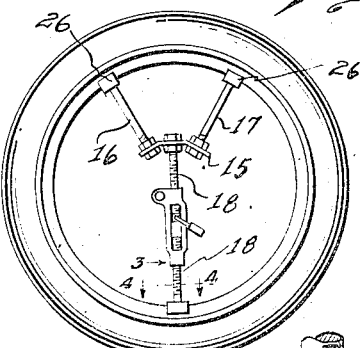
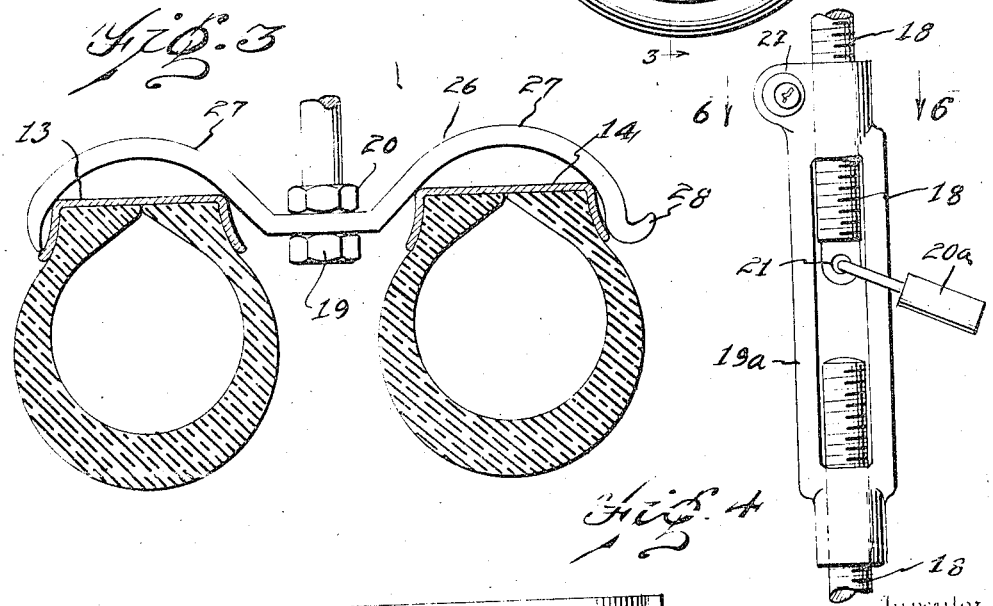
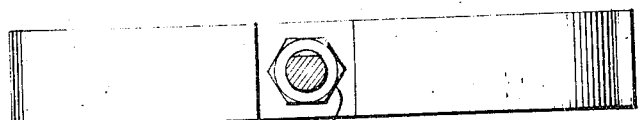
Walter E. Kelly Patented Oct. 16, 1923.

1,471,268

UNITED STATES PATENT OFFICE.

WALTER E. KELLY, OF HIGHLAND PARK, MICHIGAN.

DETACHABLE TIRE CARRIER.

Application filed September 15, 1921. Serial No. 500,839.

*To all whom it may concern:*

Be it known that I, WALTER E. KELLY, a citizen of the United States, residing at 72 Tyler Avenue, Highland Park, in the county of Wayne and State of Michigan, have invented new and useful Improvements in a Detachable Tire Carrier, of which the following is a specification.

The object of my invention is to provide new and useful improvements in a detachable tire carrier, of simple, durable, and inexpensive construction.

A further object of my invention is to provide a tire carrier for automobiles which may be used for carrying a second spare tire or spare tire and rim in addition to the spare tire or spare tire and rim for which provision is ordinarily made in connection with automobiles.

A further object of my invention is to provide means for rendering such an additional tire carrier entirely detachable, and quickly detachable from the vehicle, thereby both eliminating the additional weight where it is desired only to carry one tire and also keeping the parts for carrying the additional tire out of the way when it is only desired to carry one spare.

A further object of my invention is to provide improved means for quickly mounting an additional spare tire on the tire or tire carrier ordinarily provided in connection with a vehicle, and to provide an improved rigid fastening device for supporting such additional tire.

A further object of my invention is to provide means for locking the additional tire carrier so as to prevent unauthorized removal of the tire or carrier when the latter is installed in place.

A further object of my invention is to provide a detachable tire carrier which is also adapted for contracting and expanding the broken rims used in connection with automobile rim wheels on vehicles.

A further object of my invention is to provide a detachable tire carrier which is attractive in appearance and which has no projecting parts, the rim-holding portions being so arranged that they do not project appreciably, if at all, beyond the walls of the tire which is carried by my carrier.

With these and other objects in view, my invention consists in the arrangement, combination, and construction of the various parts of my improved device, as described in the specification, claimed in my claims, and shown in the accompanying drawings, in which:

Figure 1 illustrates my improved invention as installed upon a vehicle,

Figure 2 shows an end elevation of the parts shown in Figure 1, the vehicle, however, not being there illustrated.

Figure 3 shows an enlarged vertical sectional view taken on the line 3—3 of Figure 2, and illustrating the construction of the rim engaging pads used in connection with my invention.

Figure 4 shows an enlarged detailed view illustrating the construction of forms of a locking device on my improved detachable carrier.

Figure 5 shows a top or plan view of one of the pads for engaging the rims used in connection with my improved device, and Figure 6 shows a horizontal sectional view taken on the line 6—6 of Figure 4.

Referring to the accompanying drawings, I have used the reference numeral 10 to indicate, generally, the body of a motor vehicle having the wheels 11 and fenders 12. Suitably attached to this vehicle in any manner so as to form a rigid support therefor, is a tire supporting ring or rim 13.

It will be understood that various types of motor vehicles provide various types of carriers for their spare tires and that some of these carriers have a circular ring in connection therewith upon which the tire rim is mounted, and that some do not have such a circular ring. In either case, however, my improved device may be attached to the circular ring or to the tire rim which may be on such carrier, so that it will be understood that my improved carrier may be attached to, or detached from, either the tire rim or any suitable corresponding part used in connection with carriers on various vehicles. Such a ring or rim is designed to be generally illustrated by the part marked 13.

In the form of my device which I have here illustrated it may be said to consist, generally, of three diverging arms which have their adjacent ends rigidly supported relative to each other and which carry at their outer ends rim pads adapted to engage both the spare rim 13 and an auxiliary or additional spare rim 14. One or more of these arms is to be made extensible or adjustable so that pressure may be applied to force these pads into contact with the ring or rims to thereby hold the two tires stationary relative to each other.

In the form of device here illustrated, I have shown a spider consisting of a piece of sheet metal 15 having three holes therethru, each designed to receive one of the arms of the carrier. This spider is preferably bent so that the arms will extend therefrom at an angle to each other to thereby support the rims at three or more spaced points, altho it will, of course, be understood that one or both of the pads used might be lengthened somewhat to thereby eliminate one of the pads here shown.

The arms here shown consist of rods 16, 17 and 18, which have nuts 19 and 20 threaded on to said rods at either side of the spider, or the pads, for the purpose of securing the spider or pads to the rods. These nuts 19 and 20 are so arranged relative to the spider that they will hold the rods 16 and 17 rigid relative to the spider, and so that turning of the rods 16 and 17 when the device is installed within a pair of rings or rims will only tighten the pressure of the pads against the rings or rims, and so that such turning cannot loosen the pads relative to such rings or rims. The rod 18 is constructed in two parts which are connected together by a turnbuckle structure 19ª suitably threaded whereby this rod may be adjusted as to its length to thereby urge all of the pads into contact with the rims simultaneously, and with an equalized pressure and to hold such pads into contact with such rims. I have here illustrated two forms of locking device to prevent unauthorized tampering with the turnbuckle, one of which consists of passing a padlock shackle 20ª around one section of the turnbuckle 19ª and thru an opening 21 in the end of one of the sections of the rod 18. Another form of locking device is suggested at the upper part of the turnbuckle device 19ª by the cylinder lock device 22 which has a lug 23 movable with the cylinder to enter a longitudinal slot 24 in the turnbuckle 19ª and to extend into another longitudinal slot 25 in the upper section of the rod 18. Where the latter locking device is used, it will be seen that the turnbuckle will be turned to position, when tight, where the lug 23 may enter the slot 25, and a key supplied to force the lug 23 into said slot 25 thereby preventing rotation of the turnbuckle relative to the rod 18 unless the operator has the key necessary for operating the lug 23.

In connection with the view of the pads as shown in Figure 5, it will be noted that I have there shown the rod 18 as having a flat side which will pass thru a correspondingly flat sided opening in the pad 26 to thereby prevent the rods from being turned relative to the pads when the pads are in engagement with the rims or rings.

The pad members 26 in the form here shown consist of pieces of strap iron or steel of somewhat greater length than the width of two rims for holding tires, so that these pads 26 may be bowed at 27 adjacent to either end to fit around the inside of the rims. One end of these pads may be turned over at 28 to form a hook member for a purpose which will hereafter be described. The nuts 19 and 20 which engage the central portions of these pads 26 may be either rounded off or some provision may be made to allow slight play or springing of the end portions, or bowed portions 27 relative to the central portions of the pads, so that when the arms 16, 17 and 18 are forced outwardly by the turnbuckle 19ª, then that the pressure on each of these arms will be equalized or divided between the ends of the pads to thereby force each of the ends of each of the pads into contact with the corresponding portions of the rings or rims within substantially equal pressure.

In connection with the bowed portions 27 of the pads 26, it will be noted that the central portions of these bowed parts are on a substantially sharp curve, that the inner end of the bowed part is a substantially straight portion, or approaches a straight portion, extending up with a relatively slight angle, while the outer end of the bowed portion is curved quite sharply so that it approaches vertical planes. The purpose of this peculiar structure of these pads is to provide room at the central part of the bowed portion fo receiving various flanges or the like, and at the same time providing that each bowed portion would contact with the inner edges of the rim at either side. By having a relatively sharp curve each approaches a vertical plane at the outer end of the bowed portion, and a relatively slight curve which approaches a horizontal at the other end of the bowed portion. It will be seen that the end of the bowed portion will always hook against and bear against the outside edge of the rim, and that the rim will be locked in this position so that there will be substantially no portion of the pad projecting beyond the walls of the tire on the ring. I consider this an important feature of my invention, as it enables me to make my device more sightly and at the same time displaces rims at the other ends of the pads to thereby make it that much more difficult to apply any tool in an unauthorized attempt to remove the rim from the pad.

I consider this feature of equally pressing the sockets formed in these pads by the bowed portions 27 against the rings or rims by the pressure applied between the bowed portions of each pad, to be one of the more important features of my invention.

Another important feature of my invention is that the device may be used for expanding rims of the broken ring type after a tire has been placed thereon, by simply placing the pads within the ring and then turning the turnbuckle to separate the pads 26. The hooks 28 may be also hooked over the edges of a rim to thereby contract the rim where it is desired to take a tire off one of these broken ring type of rims.

Among the outstanding features of my device as used in connection with its major purpose, namely, the forming of a detachable support for an additional spare tire, it may be mentioned that the entire device may be removed from the vehicle so that it will not be in the way when it is desired to run the vehicle with but one spare tire. Another advantage is that the device holds an additional rim so that it is substantially as rigidly supported as the rim which is supported by the permanent supports of the vehicle. A further advantage resides from the fact that the additional rim may be secured to the rim ordinarily carried by simply operating the turnbuckle 19ª and then the latter can be locked in any suitable manner to thereby prevent unauthorized tampering with either the additional rim and tire, or the regular spare rim and tire.

Another advantage resides in the fact that with the construction here shown, the device can be very readily dis-assembled, if desired, and stowed away in a very small space. It is also, when adapted for an ordinary car, so arranged that it can be stowed away under the back seat without being dis-assembled.

It will be understood that the form of device here shown is merely illustrative of the principle of my invention, and that a large number of alterations in the structure may be made without departing from the spirit of my invention. For instance: Part or all of the pads 26 may be rotatably mounted on their respective bars so that they may be turned to lie in the plane of the device to permit the same to lay somewhat flatter within a tool box or compartment. Also, the rods 16, 17, and 18 may be made out of any suitable form of material, such as channel bar, and may be rigidly secured together at their adjacent ends in any suitable manner, such for instance, as by welding, or by a spider of different construction. Other means may also be provided for adjusting the length of the arms to thereby urge the pads 26 toward or from each other, and in fact the structure for so urging these pads toward or from each other may be wholly altered providing the principle of my invention is retained. It is also possible to form the pads 26 integral with the arms 16, 17, and 18, or, any of these arms integral with each other.

Some other changes may be made in the arrangement and construction of the various parts of my improved device without departing from the spirit of the invention therein, and it is my intention to cover by my claims such changes as may be reasonably included within the scope thereof.

I claim as my invention:

1. In a detachable spare tire carrier, rim engaging pads having a bowed portion adjacent each end, said bows shaped to grip the edges of the rims and provide an open space within the rims, diverging arms having their adjacent ends secured together and having their outer ends secured to said pads midway between the bowed portions, and one of said arms including means for adjusting said arms simultaneously to thereby urge the pads away from each other and the bowed portions thereof into gripping engagement with the edges of the rim.

2. In a detachable spare tire carrier, diverging arms having their adjacent ends secured together, rim engaging pads secured to the outer ends of said arms, said rim engaging pads having outwardly turned hook members formed thereon.

3. In a detachable spare tire carrier, diverging arms having their adjacent ends secured together, rim engaging pads secured to the outer ends of said arms intermediate of the ends of said pads, each pad having a bow shaped portion disposed at each side of the arms adapted to engage the edges of rims and leave an open space between said edges, one of said arms including means for adjusting all of the arms to urge the pads toward and from each other simultaneously.

4. In a spare tire carrier, diverging arms having their adjacent ends secured together, rim engaging pads secured to the outer ends of said arms intermediate of the ends of said pads, said pads having a bow shaped portion at each side of the arms adapted to engage the edges of rims and provide a space between the rims and bows, and one of said arms including means for adjusting said arms to urge said pads toward and from each other to thereby attach and detach the carrier to and from a permanent carrier and to fix a second rim in place on the detachable carrier.

5. In a detachable spare tire carrier, diverging arms having their adjacent ends secured together, rim engaging pads secured to the outer ends of said arms intermediate of the ends of said pads, the latter having a bowed portion at each side of the arms adapted to engage rims, the outer ends of said bowed portions being relatively sharply curved and the inner ends of said bowed portions approaching a straight line.

6. In a detachable spare tire carrier, a plurality of rim engaging pads, each having a rim engaging portion at each end, said rim engaging portions being bowed and having a relatively sharp curvature at their outer ends and a relatively slight curvature at their inner ends, and means engaging said rim engaging pads intermediate of the rim engaging portions for moving said pads toward and from each other.

7. In a detachable spare tire carrier, rim engaging pads having a bowed portion adjacent each end, said bows shaped to grip the edges of the rims and provide an open space within the rims, diverging arms having their outer ends secured to said pads midway between the bowed portions, adjusting means being provided to move said arms simultaneously to thereby urge the pads away from each other and the bowed portions thereof into gripping engagement with the edges of the rim.

Dated Aug. 29, 1921.

WALTER E. KELLY.